(12) United States Patent
Sanders et al.

(10) Patent No.: US 7,895,820 B2
(45) Date of Patent: Mar. 1, 2011

(54) SEAL FOR PULSE DETONATION ENGINE

(75) Inventors: Bobby W. Sanders, Westlake, OH (US);
Charlotte A. Sanders, Westlake, OH (US); Lois J. Weir, Akron, OH (US)

(73) Assignee: Techland Research, Inc., North Olmsted, OH (US)

( * ) Notice: Subject to any disclaimer, the term of this patent is extended or adjusted under 35 U.S.C. 154(b) by 1109 days.

(21) Appl. No.: 11/560,600

(22) Filed: Nov. 16, 2006

(65) Prior Publication Data

US 2009/0120059 A1    May 14, 2009

Related U.S. Application Data

(60) Provisional application No. 60/737,297, filed on Nov. 16, 2005.

(51) Int. Cl.
*F02C 5/12*    (2006.01)
(52) U.S. Cl. ........................ 60/39.39; 60/247
(58) Field of Classification Search .................. 60/247, 60/39.38, 39.39, 39.76
See application file for complete search history.

(56) References Cited

U.S. PATENT DOCUMENTS

| | | | | |
|---|---|---|---|---|
| 3,332,236 | A * | 7/1967 | Laszlo Kunsagi | 60/39.39 |
| 4,570,438 | A * | 2/1986 | Lorenz | 60/39.39 |
| 4,603,549 | A * | 8/1986 | Albrecht | 60/791 |
| 5,513,489 | A * | 5/1996 | Bussing | 60/39.38 |
| 5,901,550 | A * | 5/1999 | Bussing et al. | 60/39.38 |
| 5,960,625 | A * | 10/1999 | Zdvorak, Sr. | 60/39.34 |
| 6,637,187 | B2 | 10/2003 | Sanders et al. | |
| 7,251,928 | B2 * | 8/2007 | Kojima et al. | 60/247 |
| 7,328,570 | B2 * | 2/2008 | Venkataramani et al. | 60/39.38 |
| 2002/0139106 | A1 * | 10/2002 | Meholic | 60/39.39 |

\* cited by examiner

*Primary Examiner*—Michael Cuff
*Assistant Examiner*—Phutthiwat Wongwian
(74) *Attorney, Agent, or Firm*—Calfee, Halter & Griswold LLP

(57) ABSTRACT

A system of controlling airflow into a pulse detonation engine includes a rotary airflow controller valve receiving air from a high-speed inlet. An engine frame includes a plurality of detonation chambers. A sealing mechanism is between the rotary airflow controller valve and the engine frame. The sealing mechanism is associated with the engine frame and limits leakage of a gas from a first of the detonation chambers to a second of the detonation chambers.

27 Claims, 21 Drawing Sheets

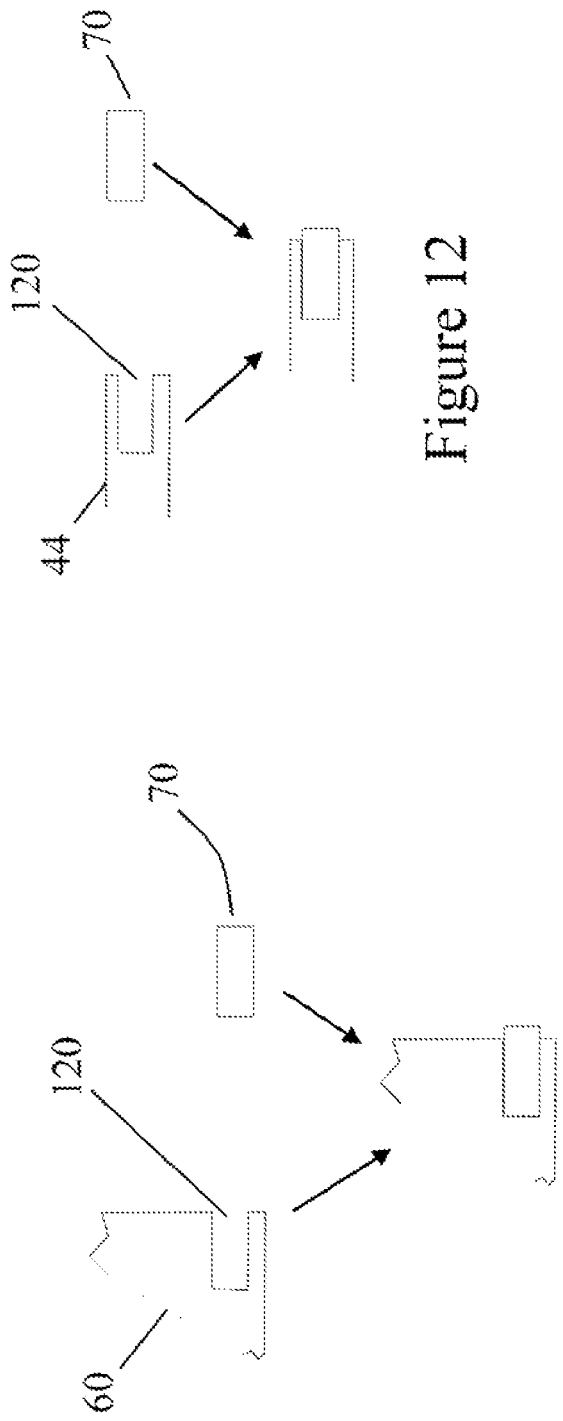
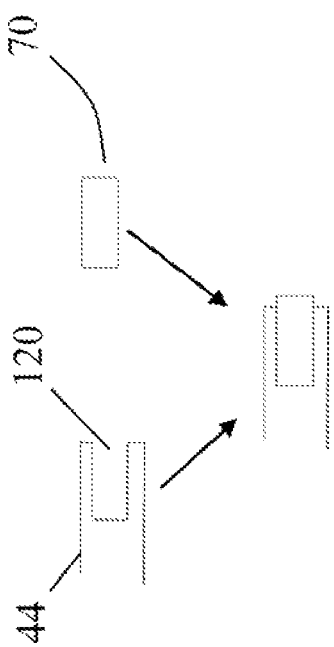
Figure 11
Figure 12
Figure 13

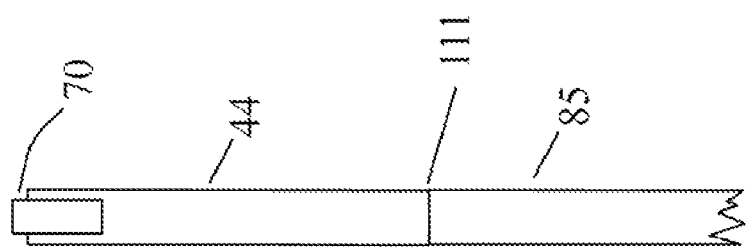
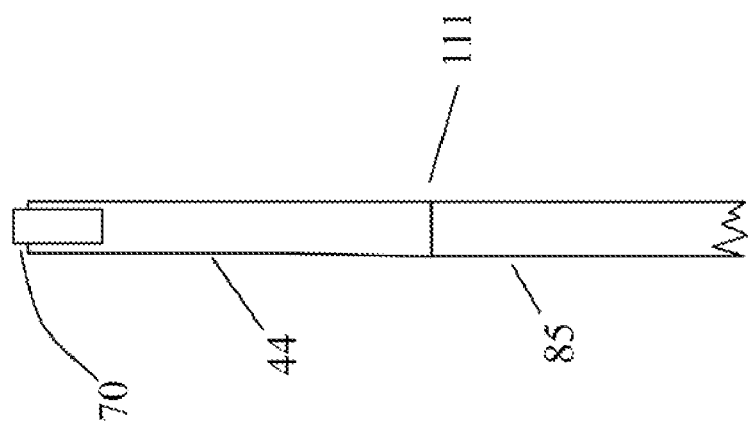
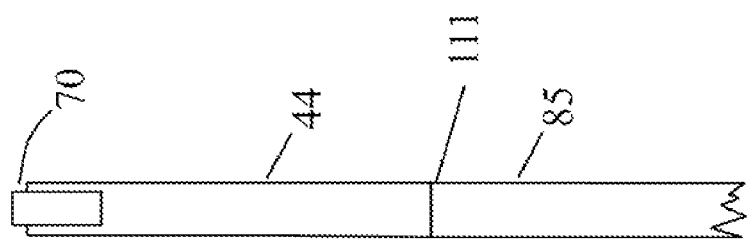
Figure 15

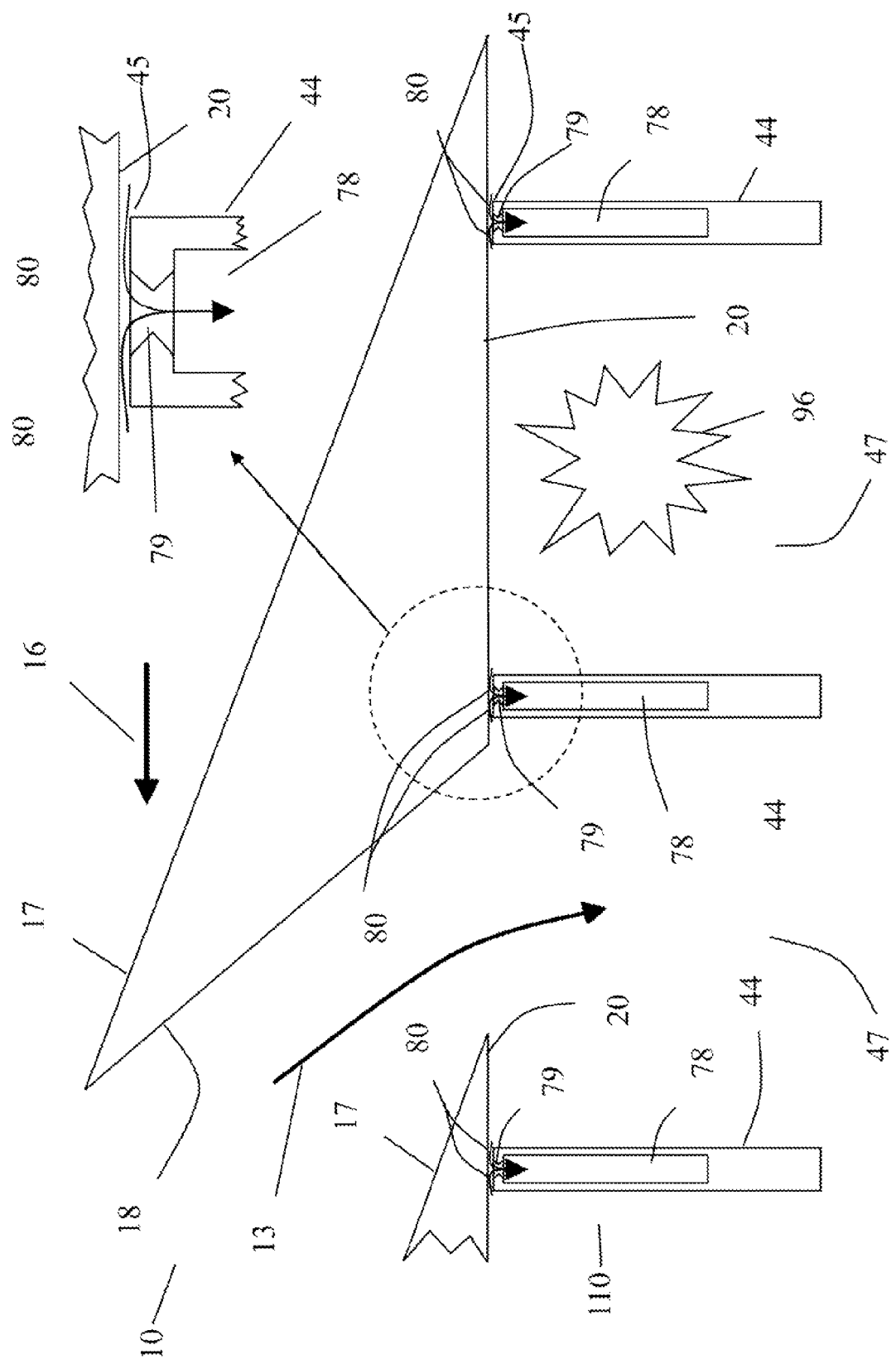

SEAL FOR PULSE DETONATION ENGINE

This application claims the benefit of U.S. Provisional Application No. 60/737,297, filed Nov. 16, 2005, which is hereby incorporated by reference.

This work was supported, at least in part, by grant F33615-03-1-2336 from the United States Air Force, Wright Patterson Air Force Base. The government has certain rights in this invention.

BACKGROUND

The present invention relates to seals for a pulse detonation engine. It finds particular application in conjunction with seals to limit or retard leakage between detonation tubes of a pulse detonation engine and will be described with particular reference thereto. It will be appreciated, however, that the invention is also amenable to other applications.

Turbojet engines are typically directly attached to aircraft inlets without an interface being required. A pulse detonation engine (PDE), on the other hand, includes an interface between the engine and an aircraft inlet. Pulse detonation engines impose different airflow demands on a high-speed inlet than do conventional turbojet engines. Turbojet engine systems require a constant and near-uniform airflow supply. The airflow demand of a detonation tube for a PDE is in a cyclic "on/off" manner. A valve distributes airflow by opening chambers to prevent the "on/off" airflow demand of each individual tube from causing a transient into the approaching airflow.

A combustion chamber of a pulse detonation engine is similar to a piston of an automobile gasoline engine. Air and fuel are injected into a chamber to form a combustible mixture with a detonation initiated by a spark source. In the case of a pulse detonation engine, the explosion creates a high-pressure wave that moves down the combustion tube to the exit. The large increase in pressure in the chamber results in propulsive thrust.

The cycle for each combustion chamber of the pulse detonation engine is as follows: airflow (oxidizer) fill, fuel injection, entrance close, and ignition. At the beginning of the propulsive cycle, the combustion chamber is opened to the inlet airflow supply. The chamber is then closed to the incoming airflow, thus eliminating the demand of airflow from the inlet. Fuel is injected into the combustion chamber and the mixture is ignited. The chamber then is re-opened for additional airflow for the next combustion cycle. A high-speed valve, such as a high-speed rotary airflow control, typically provides this opening and closing of the airflow supply port. A high-speed valve is used because high engine efficiency typically requires high combustion frequencies. U.S. Pat. No. 6,637,187 discloses such a high-speed rotary airflow control.

A seal is needed between the high-speed valve and an associated engine frame.

The present invention provides a new and improved apparatus and method for creating a seal between the high-speed valve and the associated engine frame.

SUMMARY

In one aspect of the present invention, a system of controlling airflow into a pulse detonation engine is contemplated. The system includes a rotary airflow controller valve receiving air from a high-speed inlet. An engine frame includes a plurality of detonation chambers. A sealing mechanism is between the rotary airflow controller valve and the engine frame. The sealing mechanism is associated with the engine frame and limits leakage of a gas from a first of the detonation chambers to a second of the detonation chambers.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 11, 12, and 13 are schematic views of sections A-A, B-B, and C-C, respectively, of FIG. 10 in accordance with one embodiment of an apparatus illustrating principles of the present invention;

FIG. 14a illustrates an enlarged view of the seal region within the dashed circle shown in FIG. 14 in accordance with one embodiment of an apparatus illustrating principles of the present invention;

FIG. 15 is a schematic view of an attachment method of a sealing section to an engine frame in accordance with one embodiment of an apparatus illustrating principles of the present invention;

FIG. 24 illustrates a seal design for using suction to effectively limit or retard leakage of gases between adjacent detonation chambers in accordance with one embodiment of an apparatus illustrating principles of the present invention.

DETAILED DESCRIPTION OF ILLUSTRATED EMBODIMENT

Figure 1:
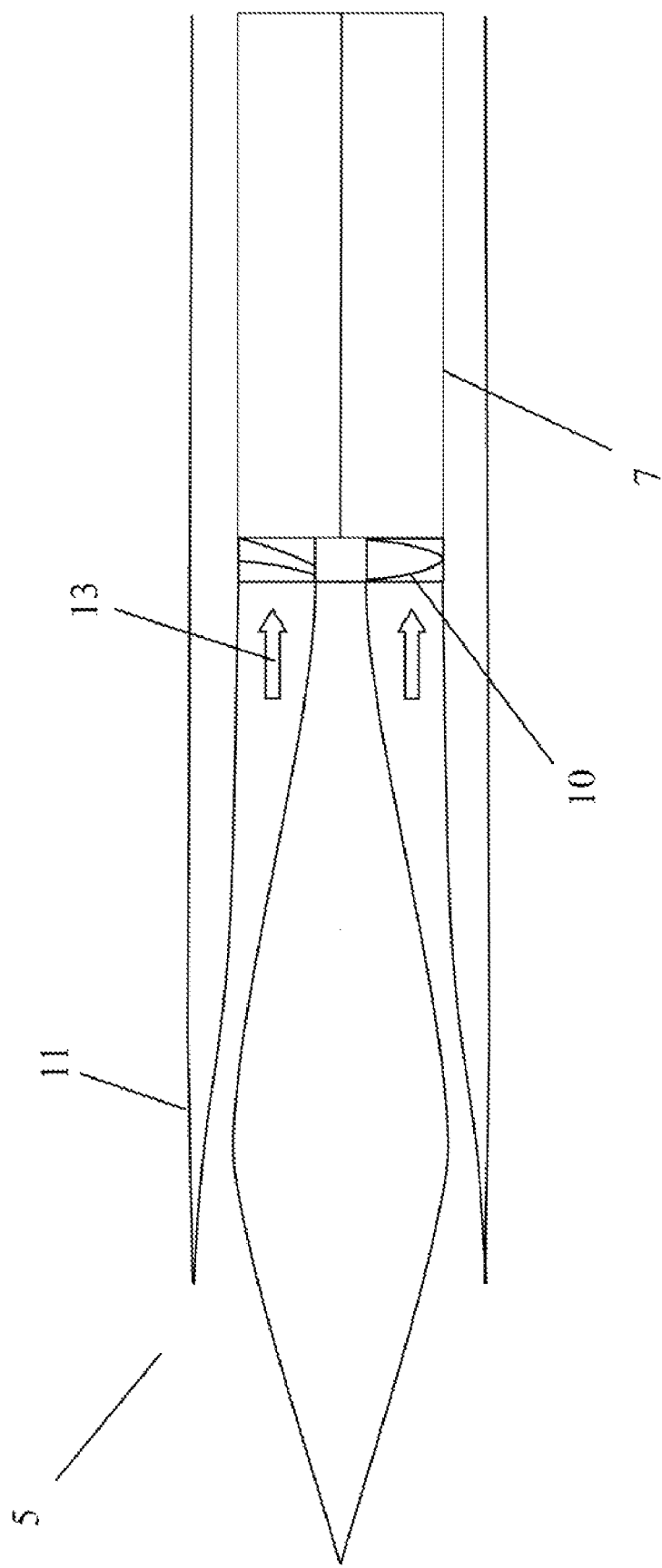
FIG. 1 is a schematic view of a high-speed propulsion system for a pulse detonation engine in accordance with one embodiment of an apparatus illustrating principles of the present invention.
Figure 2:
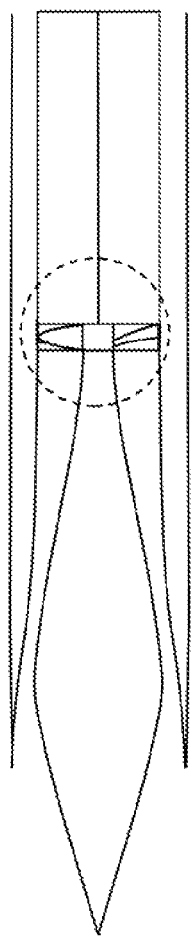
FIG. 2 is a schematic view of the high-speed propulsion system of FIG. 1 indicating a detail section.

With reference to FIG. 1, an air breathing propulsion system 5 includes a rotary airflow controller valve 10 installed between a high-speed inlet 11 and a pulse detonation engine 7. As shown, airflow 13 in an annular duct at an exit of the high-speed inlet 11 enters the rotary controller 10 and exits into the engine 7. The portion of the high-speed propulsion system that is detailed in the following figures is indicated by the dashed circle in FIG. 2.

Figure 3:
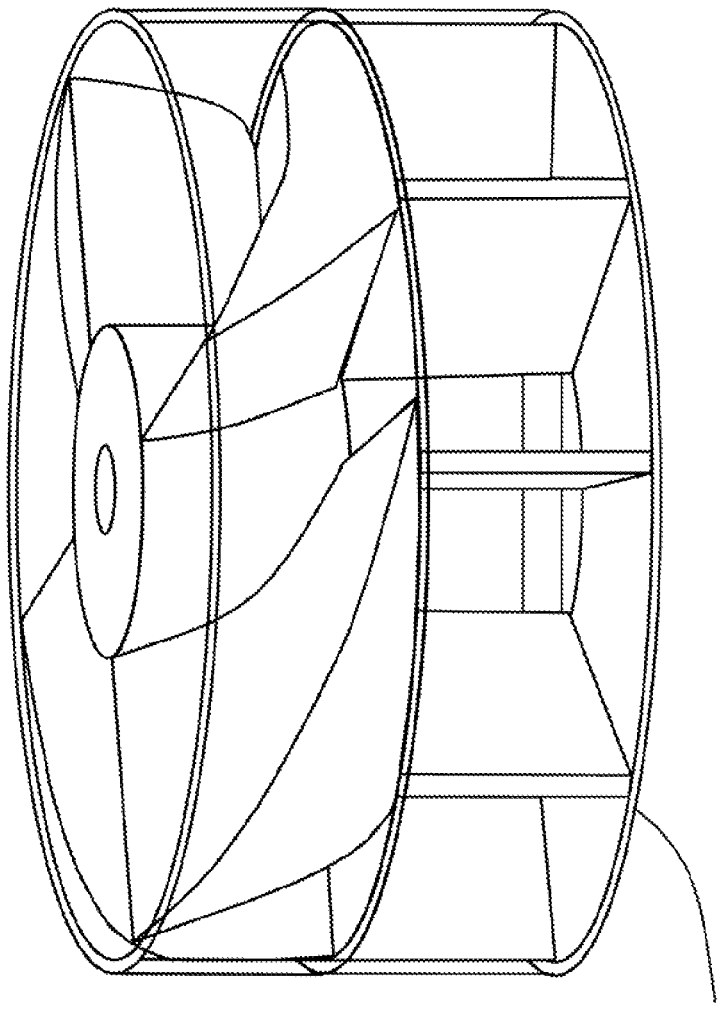
FIG. 3 is a perspective view of a rotary airflow controller and engine frame shown in the detail section of FIG. 2 in accordance with one embodiment of an apparatus illustrating principles of the present invention.
Figure 4:
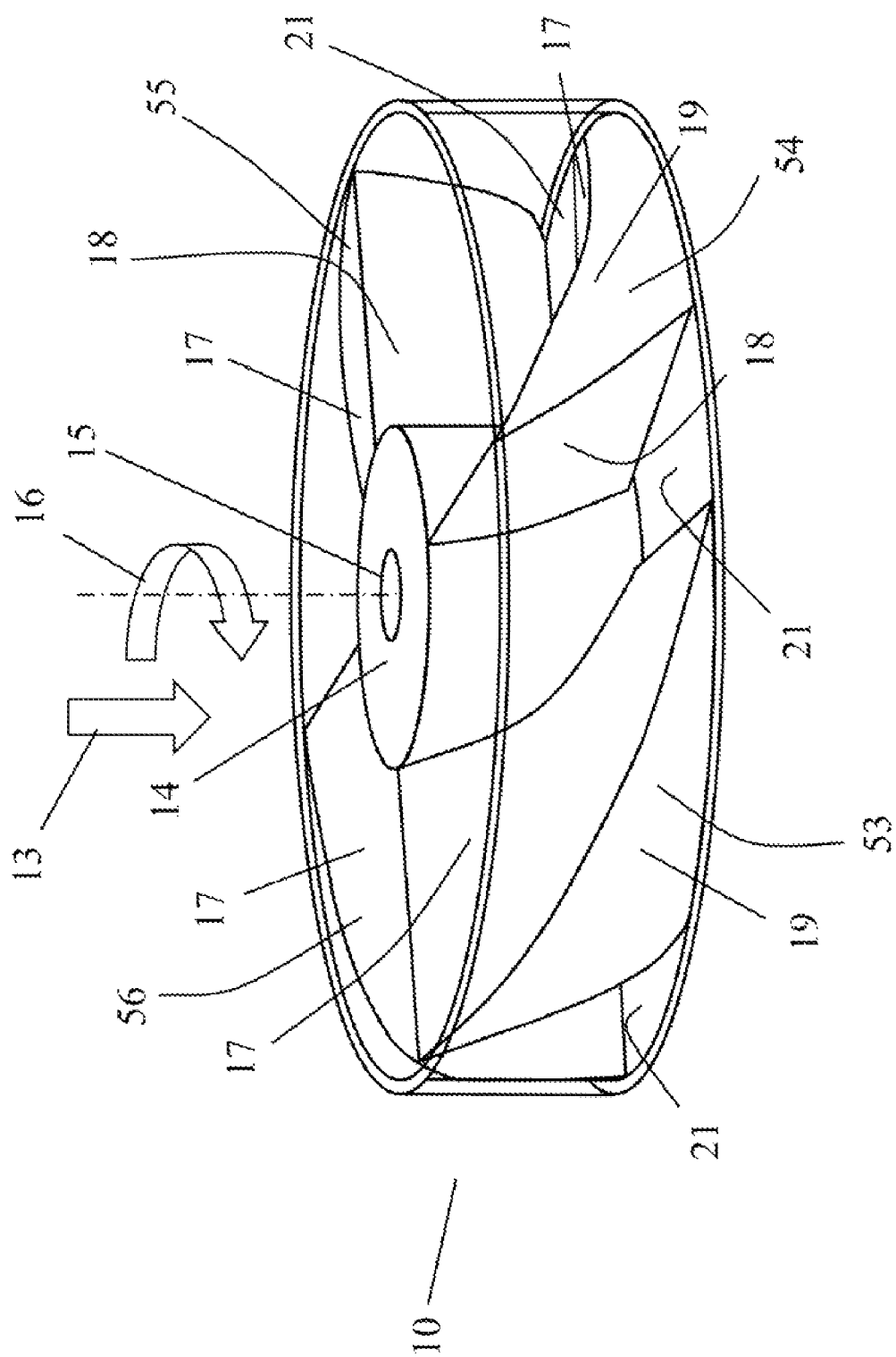
FIGS. 4 and 5 are perspective top and bottom views, respectively, of the rotary airflow controller of FIG. 3 in accordance with one embodiment of an apparatus illustrating principles of the present invention.
Figure 5:
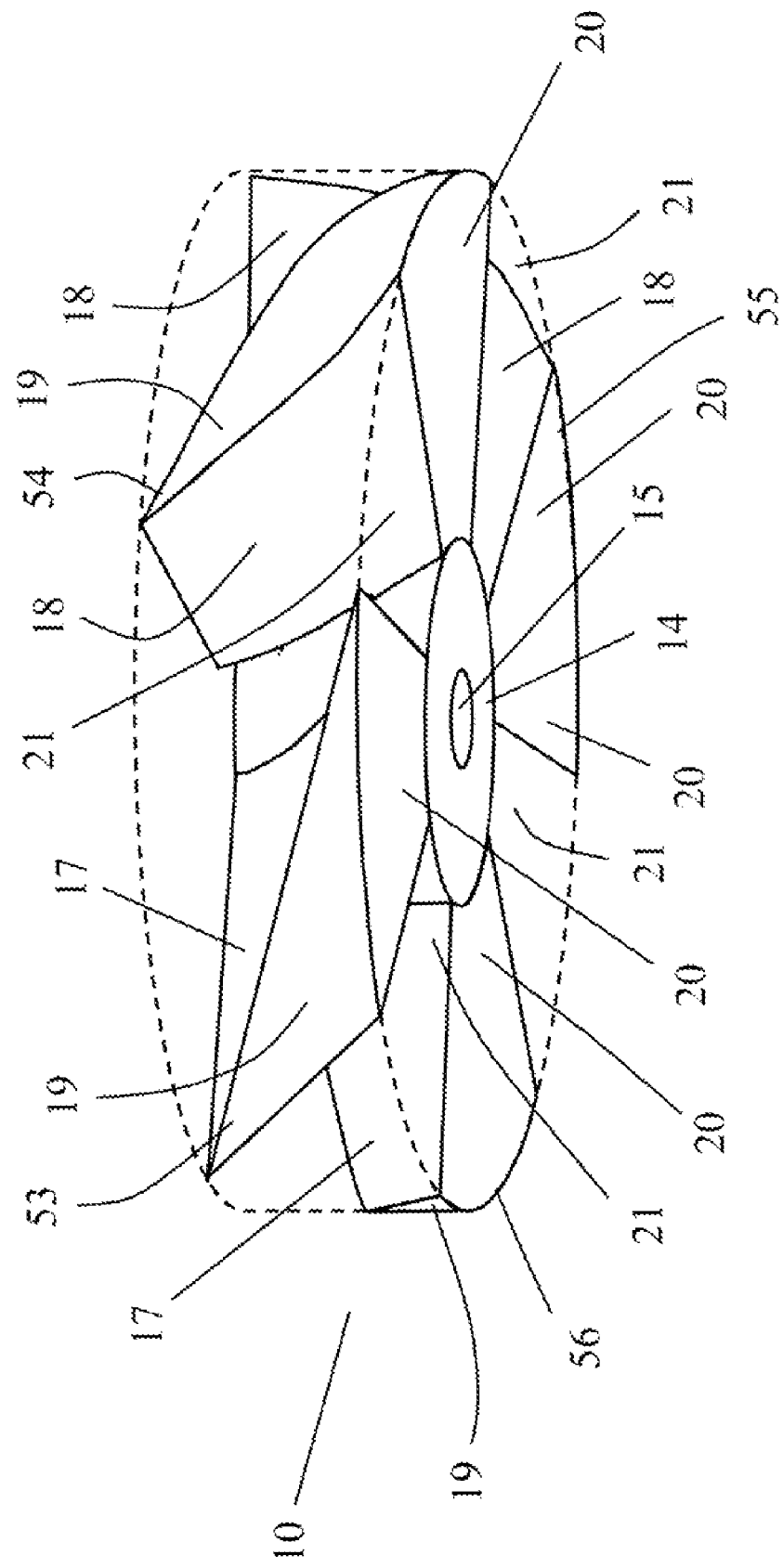

Views of the rotary airflow controller 10 are shown in FIGS. 3-5. The controller 10, as illustrated, is configured to control airflow into eight combustion or detonation chambers 87 in a pulse detonation engine. The controller 10 of FIGS. 3-5 is similar to a four-bladed propeller; however, each of the four (4) blades 53, 54, 55, 56 of the rotor 10 spans about 90° of the circumference. The airflow 13 approaching the rotary controller is indicated in FIG. 4. Each of the blades 53, 54, 55, 56 is attached to a center shaft 14, which includes a hole 15 for mounting the rotary controller 10 on a drive shaft. The rotary controller 10 rotates in the direction indicated by arrow 16. The blades 53, 54, 55, 56 are composed of an upstream surface 17, a downstream surface 18, an outer tip surface 19, and a sealing surface 20 (seal) (see FIG. 5). The sealing surface 20 is located at the exit plane.

The seal 20 used for a pulse detonation engine (PDE), as described and shown herein, is designed to prevent leakage of hot combustion gases from one detonation tube to an adjacent tube in the PDE. The seal 20 is typically located at an interface between the rotating airflow control valve 10 and a stationary engine frame 12 (see FIG. 6) of the pulsed detonation engine. The seal 20 between adjacent detonation chambers 87 (tubes) in FIG. 6 limits or retards the leakage of hot high-pressure gas from one detonation tube 87 to an adjacent tube 87. Such seals 20 may be designed to allow for free rotation of an airflow control valve, while being sufficiently close to the downstream flat closing surface of the rotary valve 10 to limit or retard leakage of the exhaust gases through the interface of the valve and detonation tube.

Several factors are considered in designing the rotor blades 53, 54, 55, 56. Such factors include geometry requirements (e.g., overlap for closing of the entrance to a combustion chamber), exit area of the inlet, rotor entrance to exit area ratio, engine entrance shape, valve height, valve diameter, radial position, radius of hub, rate of combustion, rotor speed, and the like. Aerodynamic factors that may influence the design of rotor blades include inlet diffuser exit airflow velocity, allowable engine entrance velocity, engine chamber pressure (during airflow injection), engine airflow demand, inlet design, inlet subsonic diffuser design, and the like. The surfaces of the rotor 10 may be designed to provide ducting of the incoming airflow from an air intake to the pulse detonation engine.

The sealing surfaces 20, shown in FIG. 5, provide a means of alternately shutting off the airflow supply to four of the combustion chambers in an eight-chamber engine. Open sectors 21 allow airflow to be supplied to the other four chambers not shut off by the sealing surfaces 20. The sealing surfaces 20 of the rotary airflow controller 10 are larger in angular extent than the open areas 21 at the exit of the airflow controller 10. This size difference allows the sealing surfaces 20 to overlap on the flange at the entrance opening to the combustion chamber to affect a closing of the entrance to the combustion chamber prior to ignition. The rotational speed of the rotor is dictated by the desired combustion rate. For instance, it is contemplated that the rotary airflow controller 10 illustrated in FIGS. 1-5 rotates around the center axis at about 600 rpm to provide a combustion rate of 40 firings per second for each of the eight chambers in the engine in which two opposite chambers fire at the same time.

Figure 6:
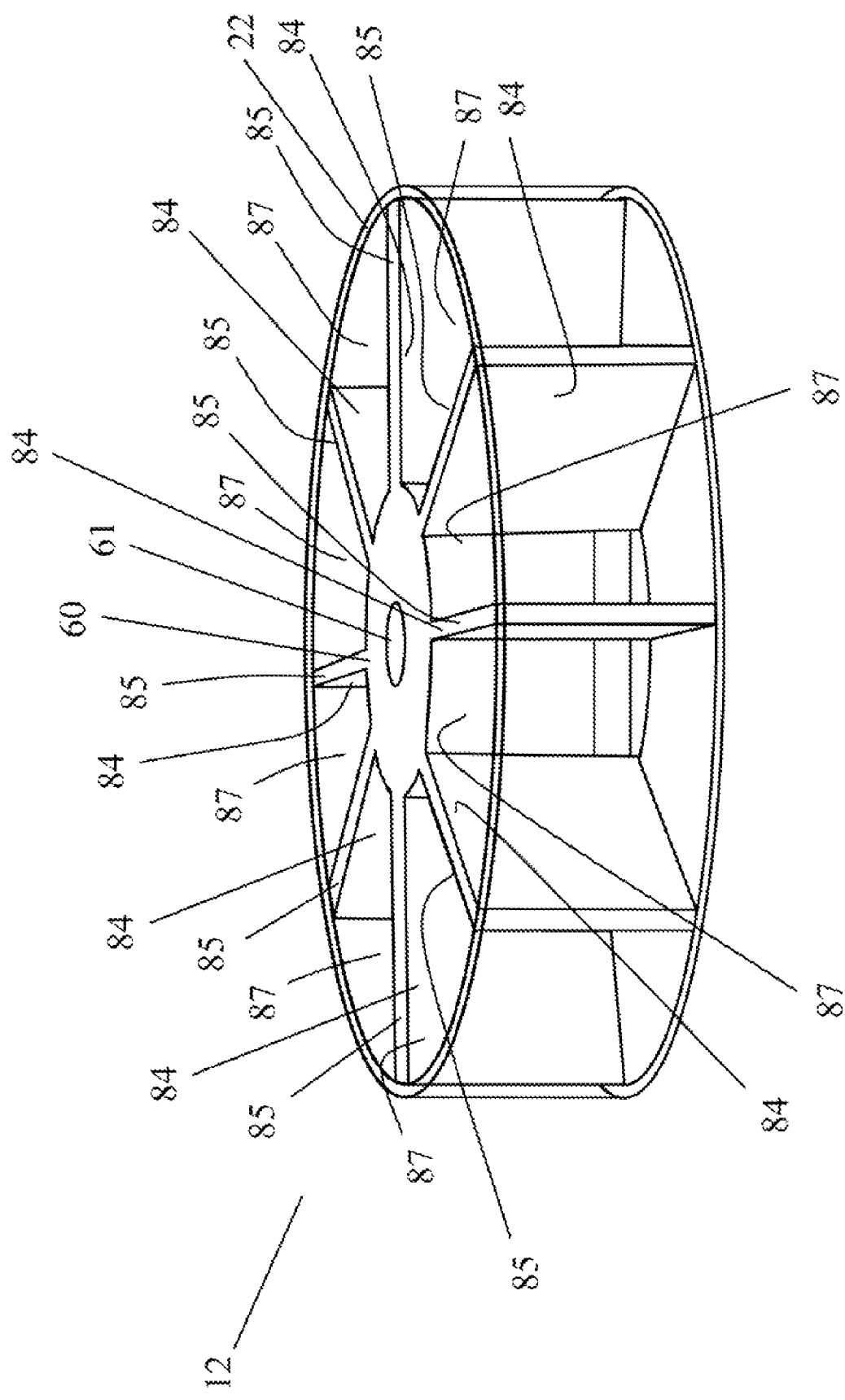
FIG. 6 is a perspective view of the engine frame of FIG. 3 in accordance with one embodiment of an apparatus illustrating principles of the present invention.
Figure 7:
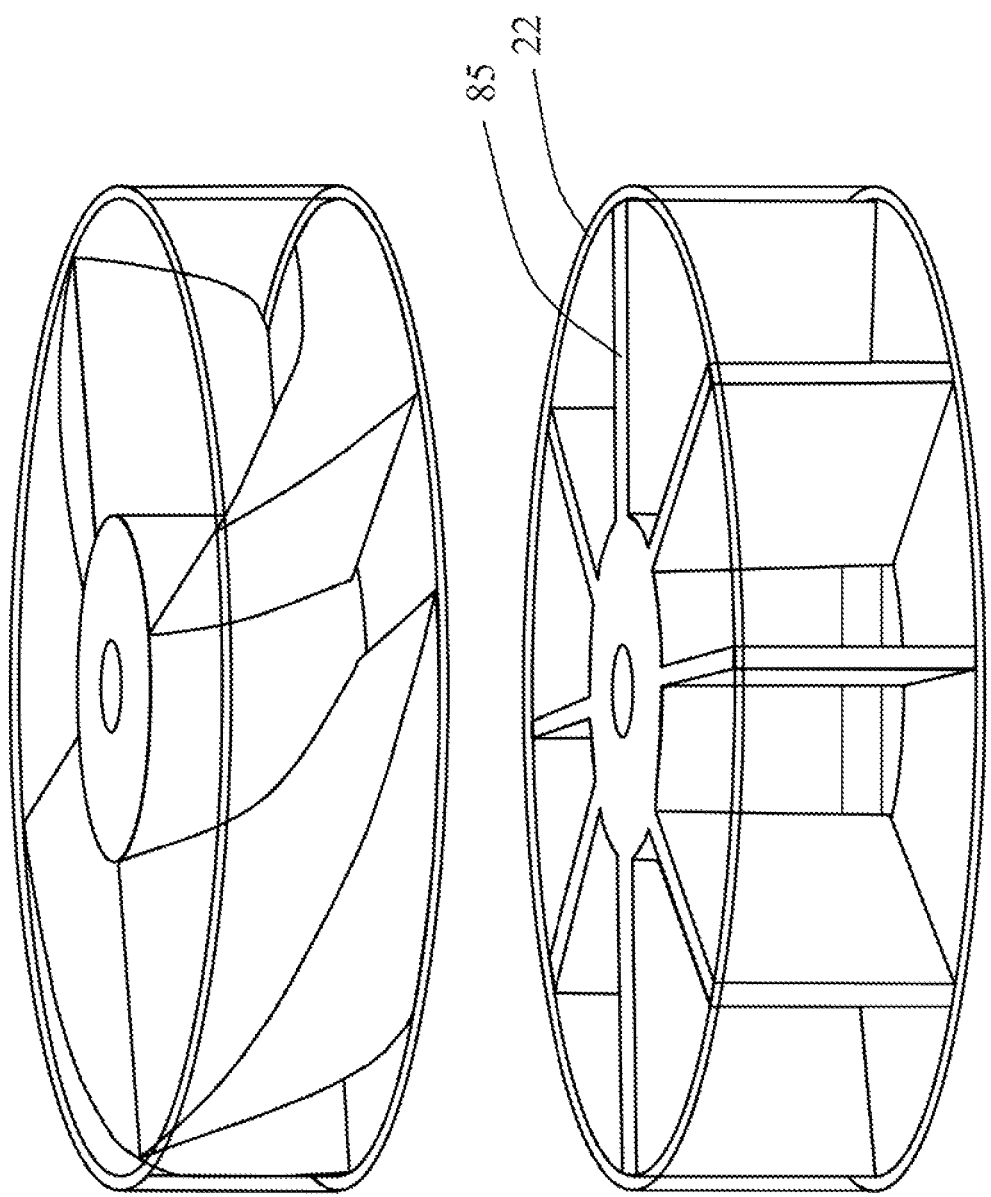
FIG. 7 is an exploded perspective view of the arrangement of the rotary airflow controller and engine frame of FIG. 3 in accordance with one embodiment of an apparatus illustrating principles of the present invention.

Referring to FIGS. 6 and 7, the engine frame 12 is illustrated including an interface plane 85. The plane 85 defines the interface between the rotary airflow controller 10 and the engine frame 12. A seal 22 along the interface 85 limits or retards leakage of gases from one of the chambers 87 to another one of the chambers 87. The seal 22 is provided along the interface 85 by either integrating the seal into the leading edge or as a separate sealing section that is attached (secured) to the leading edge of the engine frame 12. In the embodiment in which the seal 22 is integrated into the engine frame 12, it is contemplated that a gap is provided between the rotary airflow controller 10 and the seal 22 of the engine frame 12 so that the rotary airflow controller 10 rotates relative to the engine frame 12. Alternatively, it is contemplated that the rotary airflow controller 10 is positioned such that the seal 22 is in selective contact with the sealing surface 20 of the rotor 10 during rotation of the rotary valve 10 relative to the engine frame 12. The seal 22 and/or the gap act as a means for limiting leakage of a gas from one of the detonation chambers 87 to another of the detonation chambers 87.

Figure 8:
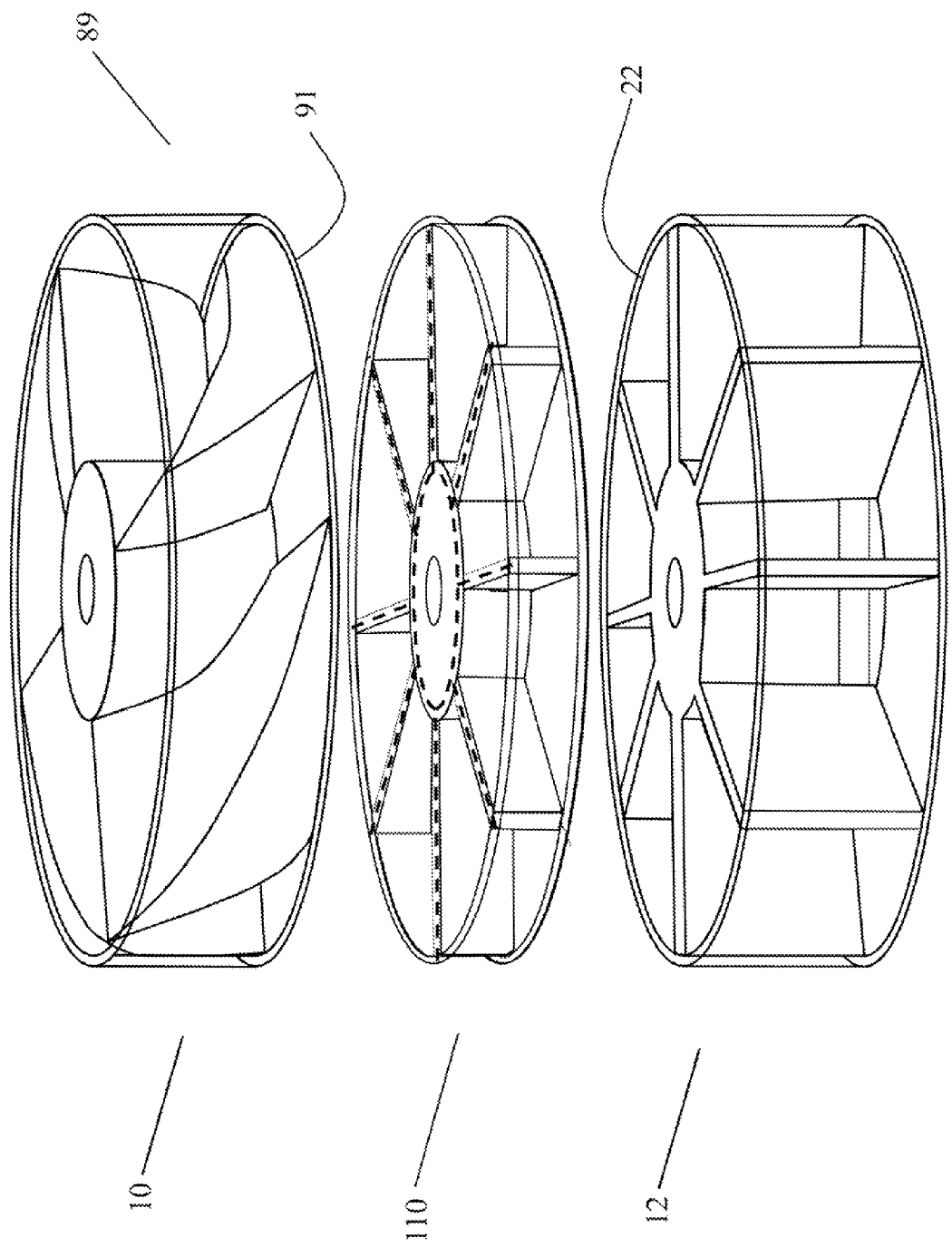
FIG. 8 is an exploded perspective view of the arrangement of a rotary airflow controller, sealing section, and engine frame in accordance with one embodiment of an apparatus illustrating principles of the present invention.

FIG. 8 illustrates an exploded view of an engine arrangement 89 in which a seal is provided in the form of a sealing section or sealing segment 110 located between the rotary valve 10 and the fixed engine frame 12.

A description of the seal segment 110 is better understood along with a description of the rotary airflow controller 10 and the engine frame 12. With reference again to FIG. 3, a downstream view of the cross-section of the rotary airflow controller 10 at the exit plane (as shown in the bottom perspective view in FIG. 5) is shown superimposed on the engine entrance frame 12 separating the combustion chambers 87 of the engine. As shown in FIG. 4, the valve 10 rotates about a center axis in the direction indicated by the arrow 16, and alternately closes and opens airflow into the combustion chambers 87 (see FIG. 3). The flat sealing surfaces 20 (see FIG. 5) of the rotary airflow controller 10 provide for closing the entrance to the combustion chambers 87 (see FIG. 3). As shown with reference again to FIG. 6, respective cross-sections of the combustion chambers 87 are segments of a circle (e.g., pie-shaped). Each of the combustion chambers 87 is defined by a portion of a center 60, two side webs 84, and an outside surface 86. The webs 84 separate the combustion chambers 87.

Figure 9:
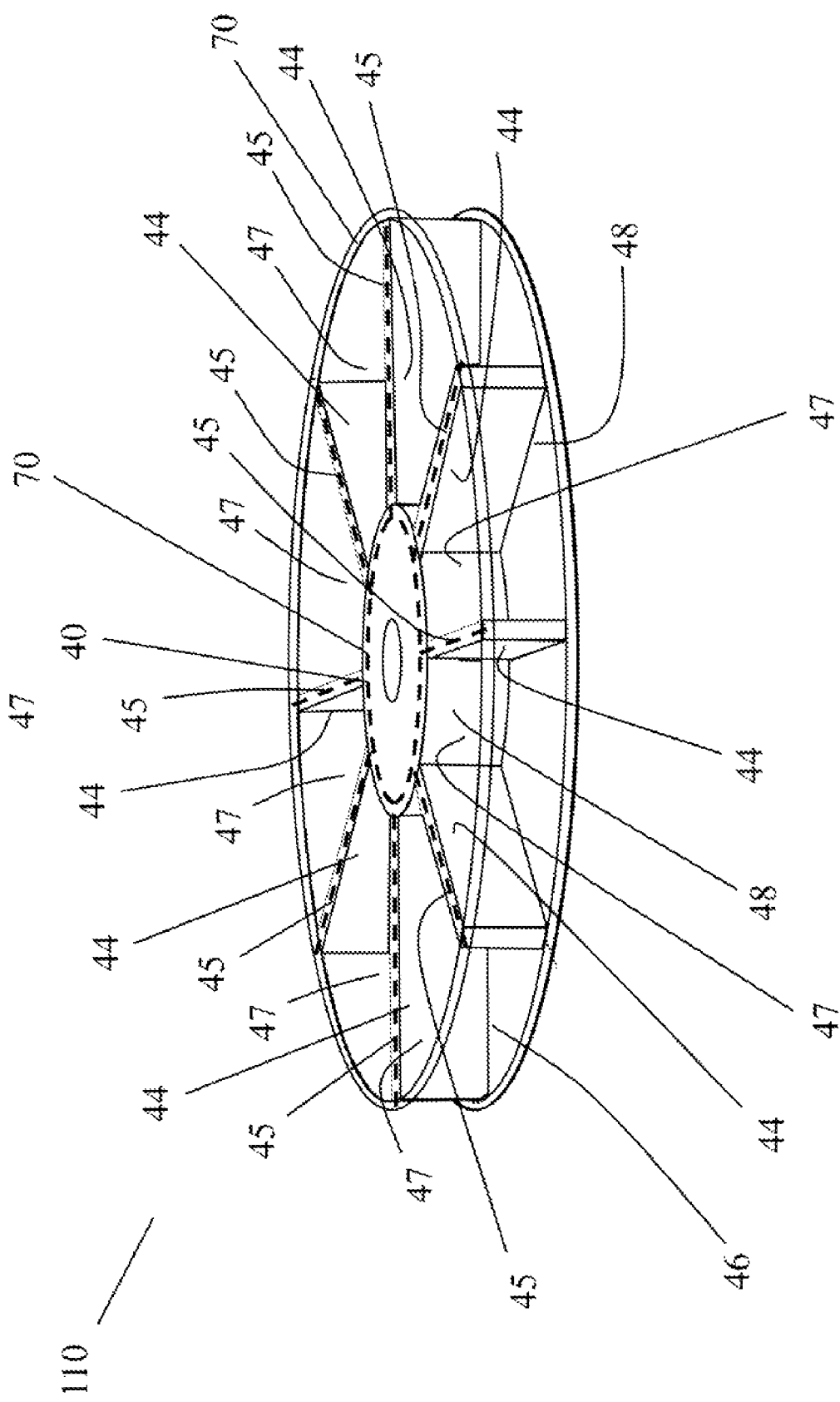
FIG. 9 is a perspective view of the sealing section of FIG. 8 in accordance with one embodiment of an apparatus illustrating principles of the present invention.

With reference to FIGS. 6, 8, and 9, the sealing segment 110 is similar to the engine frame 12. Like the engine frame 12, airflow passages 47 (detonation passages) of the sealing segment 110 contain webs 44, an inner surface 48, and an outer ring 46. The leading edge surfaces 45 include the surfaces on an inner hub 40, the webs 44, and the outer ring 46. A sealing material 70 acts as the seal 22, illustrated by the dashed lines in the leading edge surfaces 45, provides for a seal between the sealing segment 110 and the rotary airflow controller valve 10.

Figure 10:
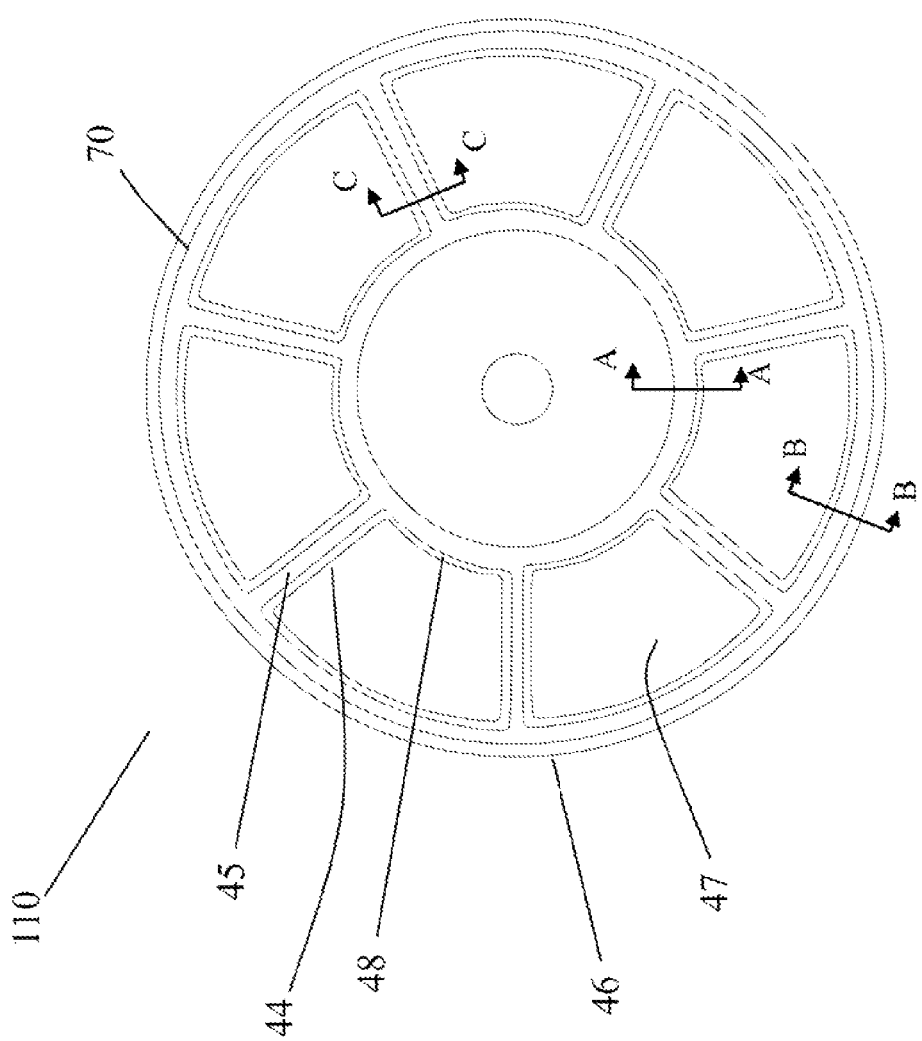
FIG. 10 is a top view of the sealing section of FIG. 8 with the integration of a sealing material in accordance with one embodiment of an apparatus illustrating principles of the present invention.

With reference to FIG. 10, a top, downstream view of the segment 110 illustrates the sealing material 70. The sealing material 70 is placed on the leading edge 45 for providing sealing around each of the airflow passages 47. Details of the cross-sections shown in FIG. 10 are presented in FIGS. 11-13. FIG. 11 illustrates cross-section A-A of FIG. 10, showing the installation of the sealing material 70 into a seal groove 60. Similarly, the installation of sealing material in cross-sections B-B and C-C of FIG. 10 are shown in FIGS. 12 and 13, respectively.

With reference to FIGS. 8 and 10, the seal 22 (sealing material 70) is provided between the sealing section 110 and the rotary airflow controller valve 10 when the sealing section 110 is positioned sufficiently close to the downstream surface 91 of the rotary valve 10 such that the gap between the sealing section 110 and the rotary valve 10 is minimized. In one embodiment, it is contemplated that the sealing material 70 is used and the gap between the rotary airflow controller valve 10 and the sealing section 110 is less than about 0.003 inches. In this embodiment, rotary airflow controller valve 10 is able to rotate relative to the sealing section 110. Furthermore, the sealing material 70 and the gap act as a means for limiting leakage of a gas from one of the detonation chambers 87 to another of the detonation chambers 87. In another embodiment, it is contemplated that the sealing segment 110 is positioned such that the sealing material 70 is in selective contact with the sealing surface 20 of the rotor 10 during rotation of the rotary valve 10. A seal is provided by installing the sealing material 70 in the leading edge of the engine frame by using a similar method of installation of the sealing material in FIGS. 12 and 13.

Figure 14:
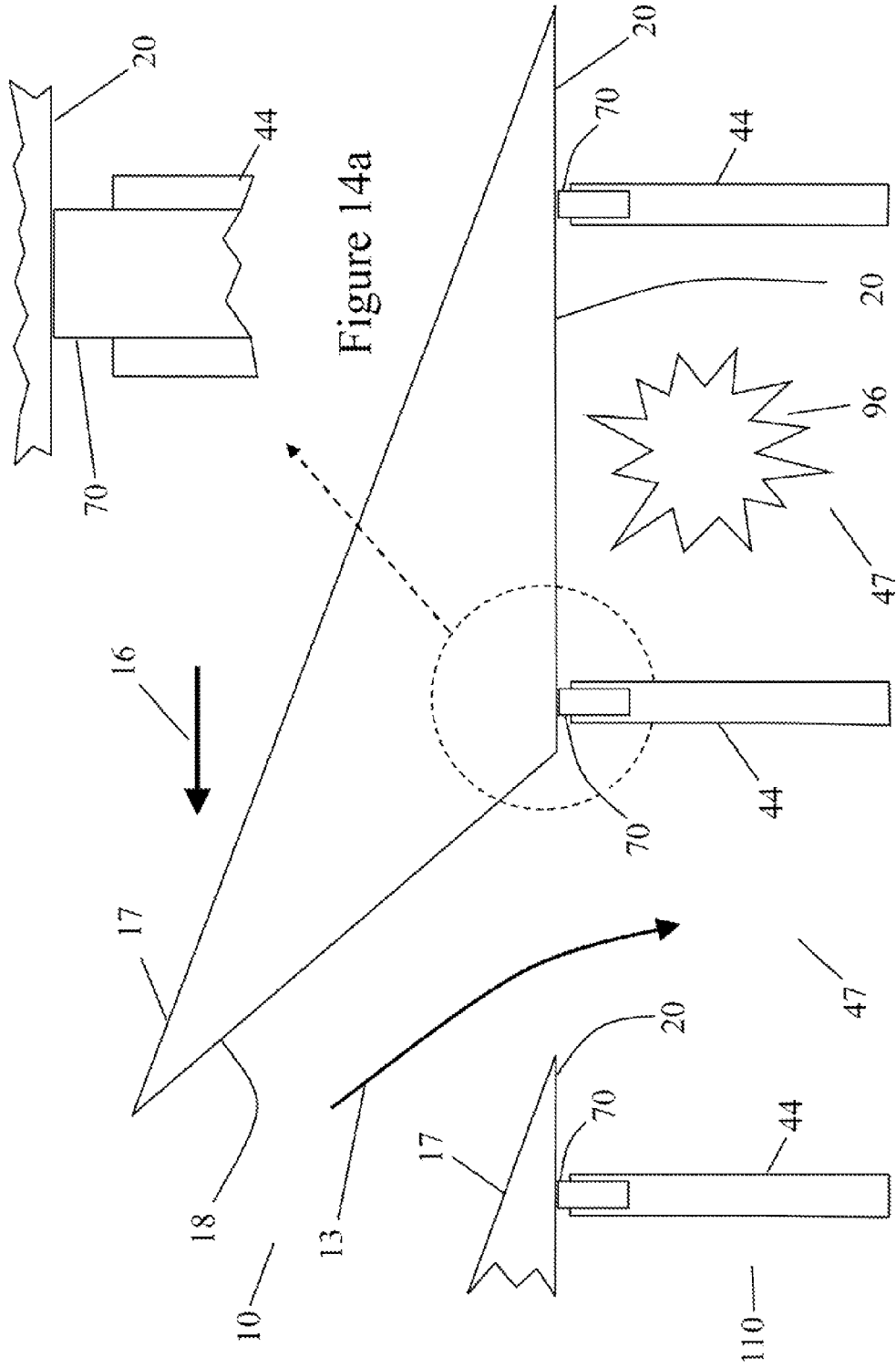
FIG. 14 is a schematic cross-sectional view of an integration of a rotary valve and a seal in accordance with one embodiment of an apparatus illustrating principles of the present invention.

FIG. 14 illustrates a cross-section of the installation of the sealing section 110 with the rotary valve 10. As the rotor 10 rotates in the direction of the arrow 16, the detonation chambers 47 are either sealed, as shown on the right of the figure, or are open to accept airflow 13, as shown on the left of FIG. 14. As illustrated in FIG. 14a, which shows an enlarged view of the seal region within the dashed circle shown in FIG. 14, the sealing material 70 prevents the hot gases from a detonation 96 in the right detonation chamber 47 from crossing over to the left chamber 47 and causing pre-detonation in the left chamber 47. The gases from the detonation 96 are prevented from crossing over to the adjacent chamber by placing the sealing segment 110 with the seal material 70 at a distance sufficiently close to the sealing face 20 of the rotor 10. The arrangement as shown in FIG. 14 limits or retards the leakage rate between adjacent detonation chambers 47.

Figure 16:
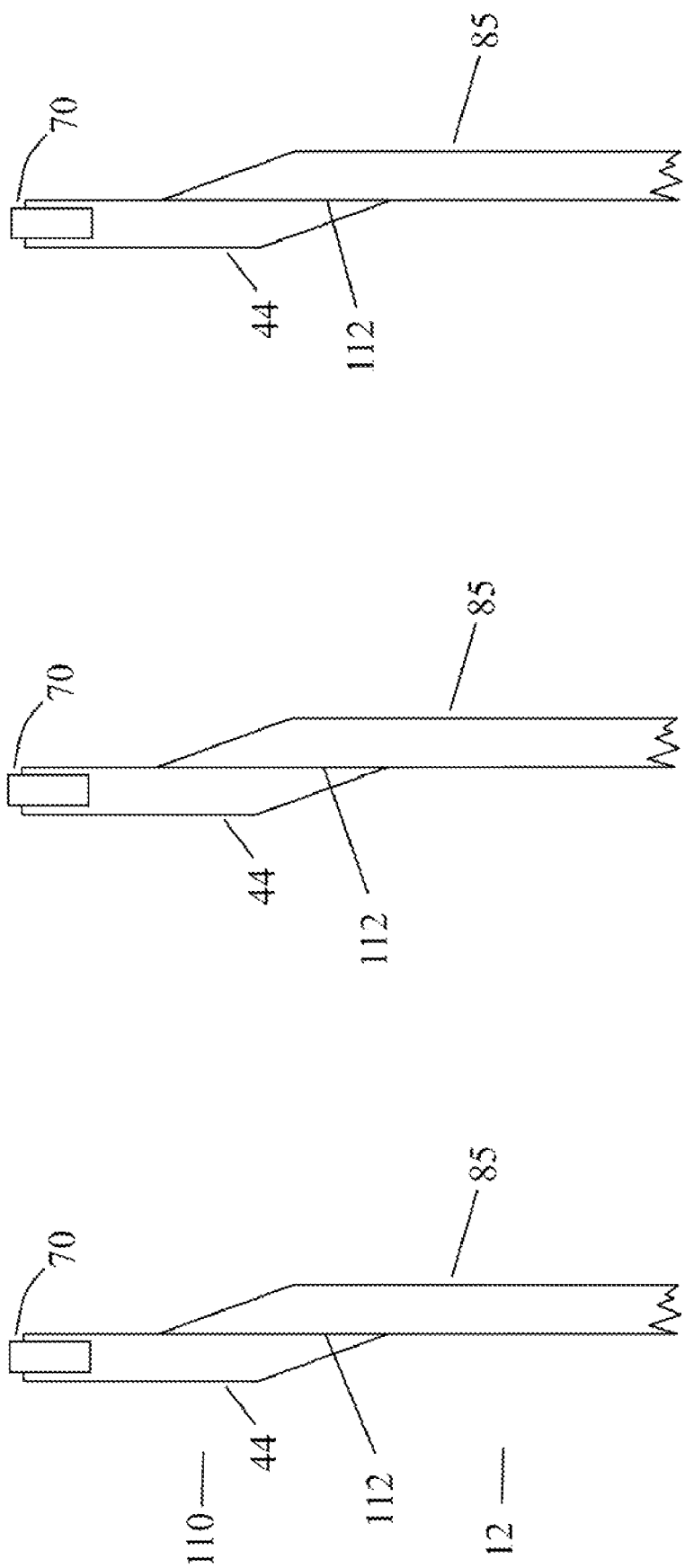
FIG. 16 is a schematic view of an attachment method of a sealing section to an engine frame in accordance with one embodiment of an apparatus illustrating principles of the present invention.

With reference to FIGS. 15 and 16, the sealing section 110 is installed directly onto the engine frame 12. The sealing section 110 shown in FIG. 15 is rigidly attached (secured) to the front (leading edge) of the pulse detonation engine frame 12 such that the webs 44 of the sealing segment 110 are positioned substantially directly above the interface plane 85 of the engine frame 12 to create a straight joint 111. However, any attachment approach or method for attaching the sealing section 110 to the engine frame 12 may be used to provide a rigid attachment. For example, FIG. 16 illustrates an alternate approach in which the webs 44 overlap (are offset from) the interface planes 85 to create an offset joint 112. The overlapping approach allows additional adjustment of the distance between the sealing section 110 and the rotary valve 10. More specifically, the joint 112 offers the option of sliding the sealing section 110 relative to the engine frame 12.

Figure 17:
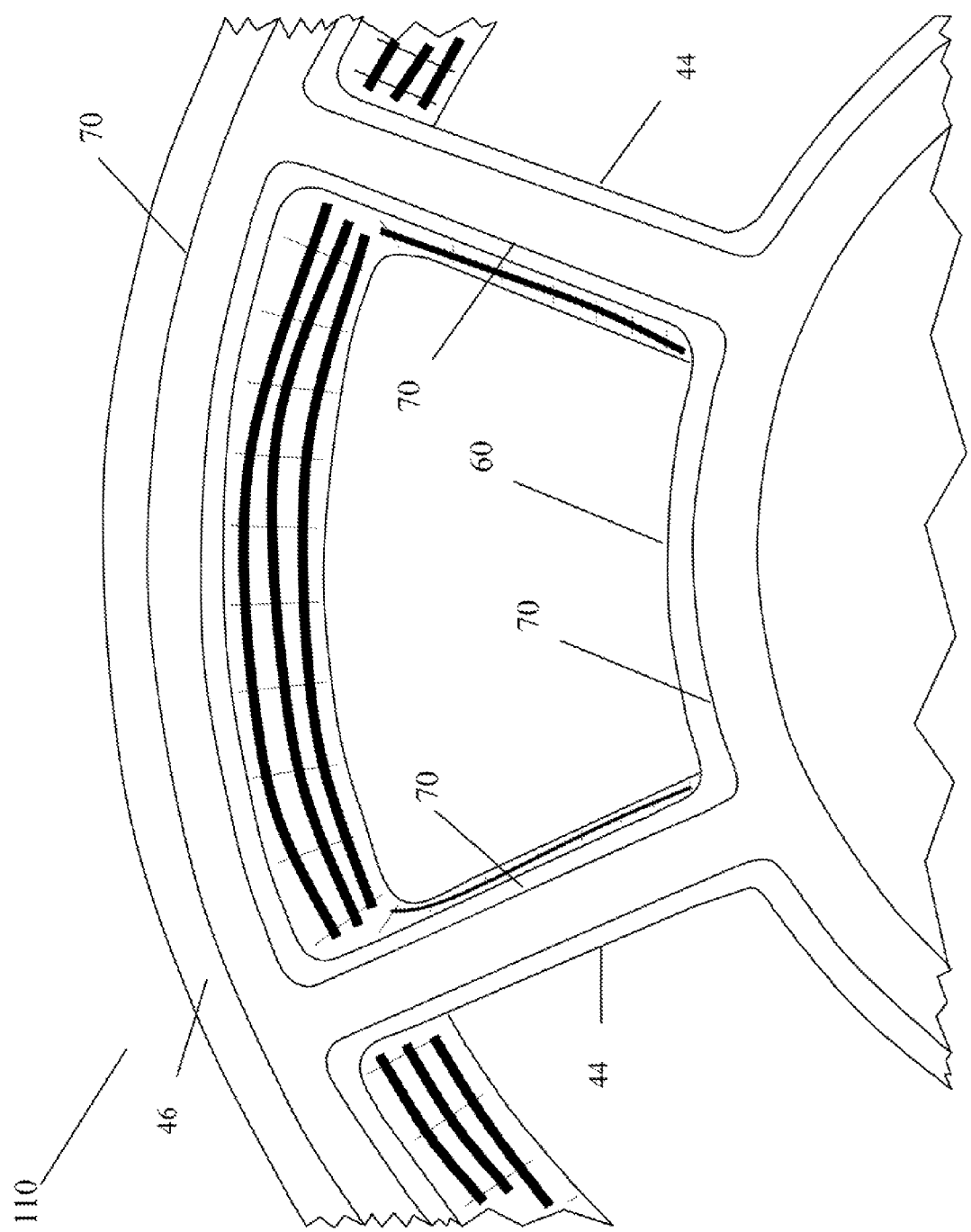
FIG. 17 illustrates a seal design with a high-temperature thermoplastic resin used as the sealing material in accordance with one embodiment of an apparatus illustrating principles of the present invention.
Figure 18:
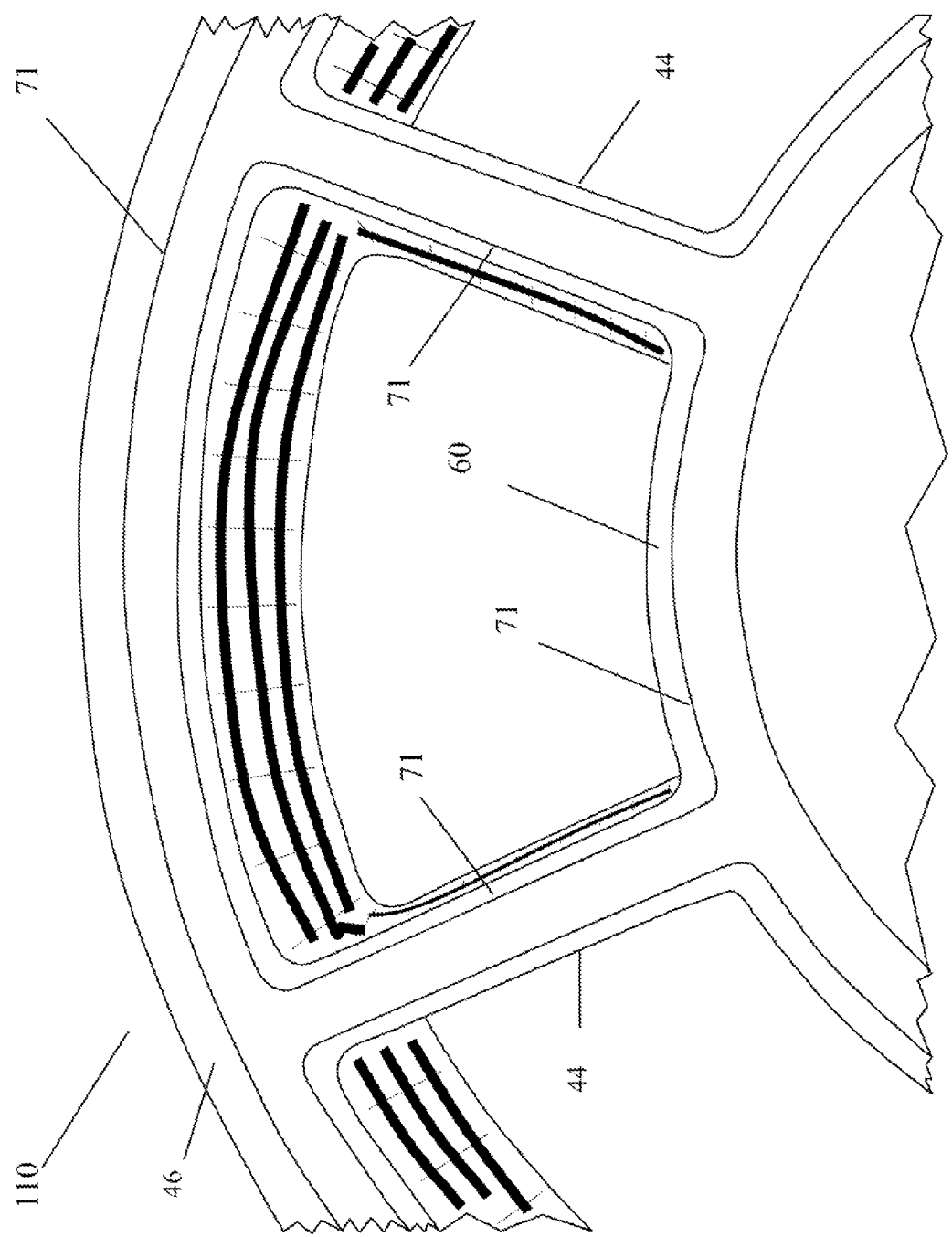
FIG. 18 illustrates a seal design with brass used as the sealing material in accordance with one embodiment of an apparatus illustrating principles of the present invention.

Several types of materials can be used for the sealing material 70 as described herein. Examples of materials are shown in FIGS. 17-21. FIG. 17 illustrates a sealing section 110 including a sealing material 70 made with a high-temperature thermoplastic resin, such as a polyamide-imide. One such example is TORLON; however, this is only one example of a wide variety or plastics the may be used as a sealing material. FIG. 18 illustrates a sealing section 110 including a sealing material 71 made with a metal material (e.g., brass (oil impregnated)). In other embodiments, it is also contemplated that the sealing material is a carbon material.

Figure 19:
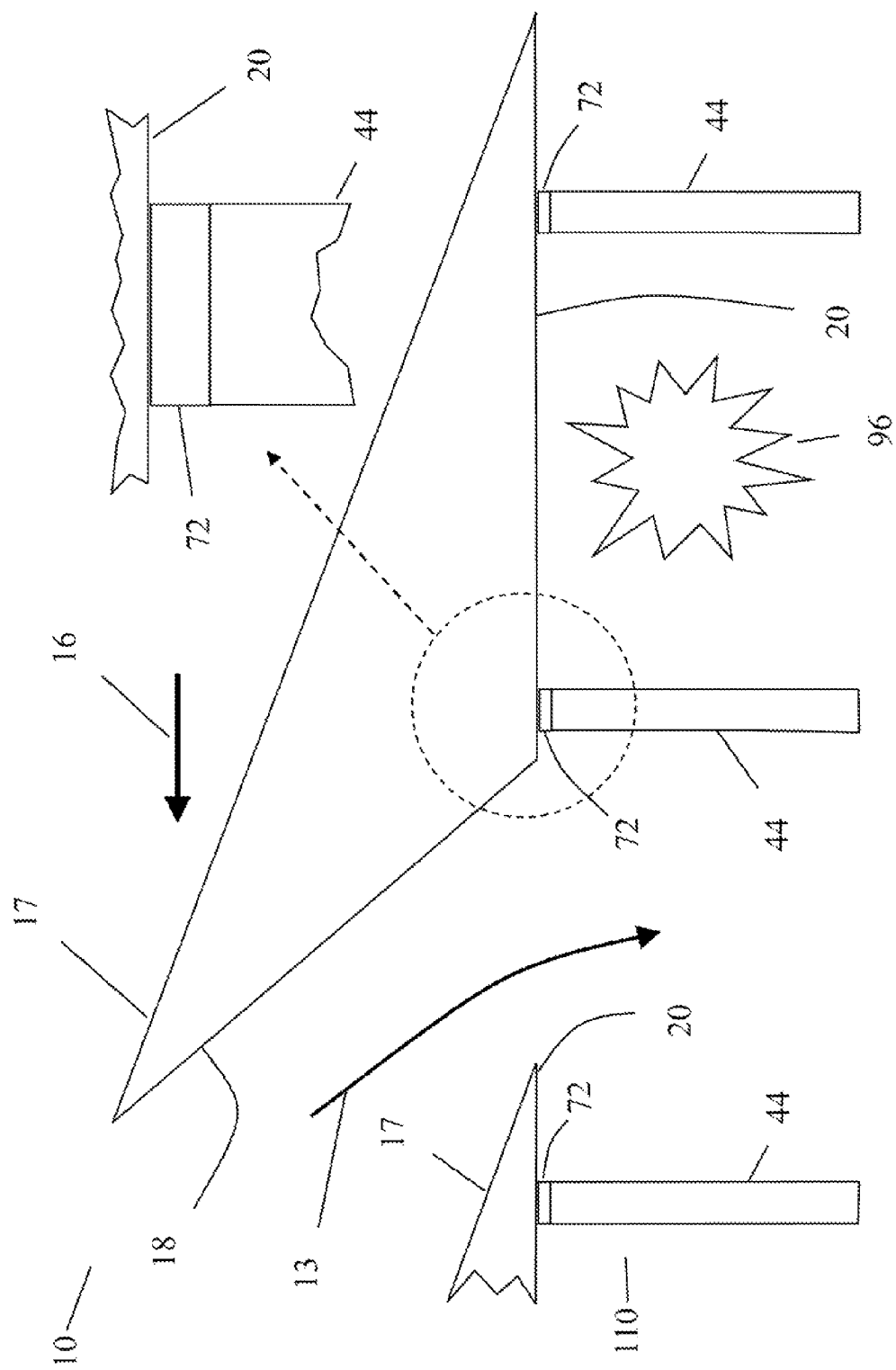
FIGS. 19 through 21 illustrate a seal design in accordance with one embodiment of an apparatus illustrating principles of the present invention where the sealing section is a honeycomb structure.
Figure 20:
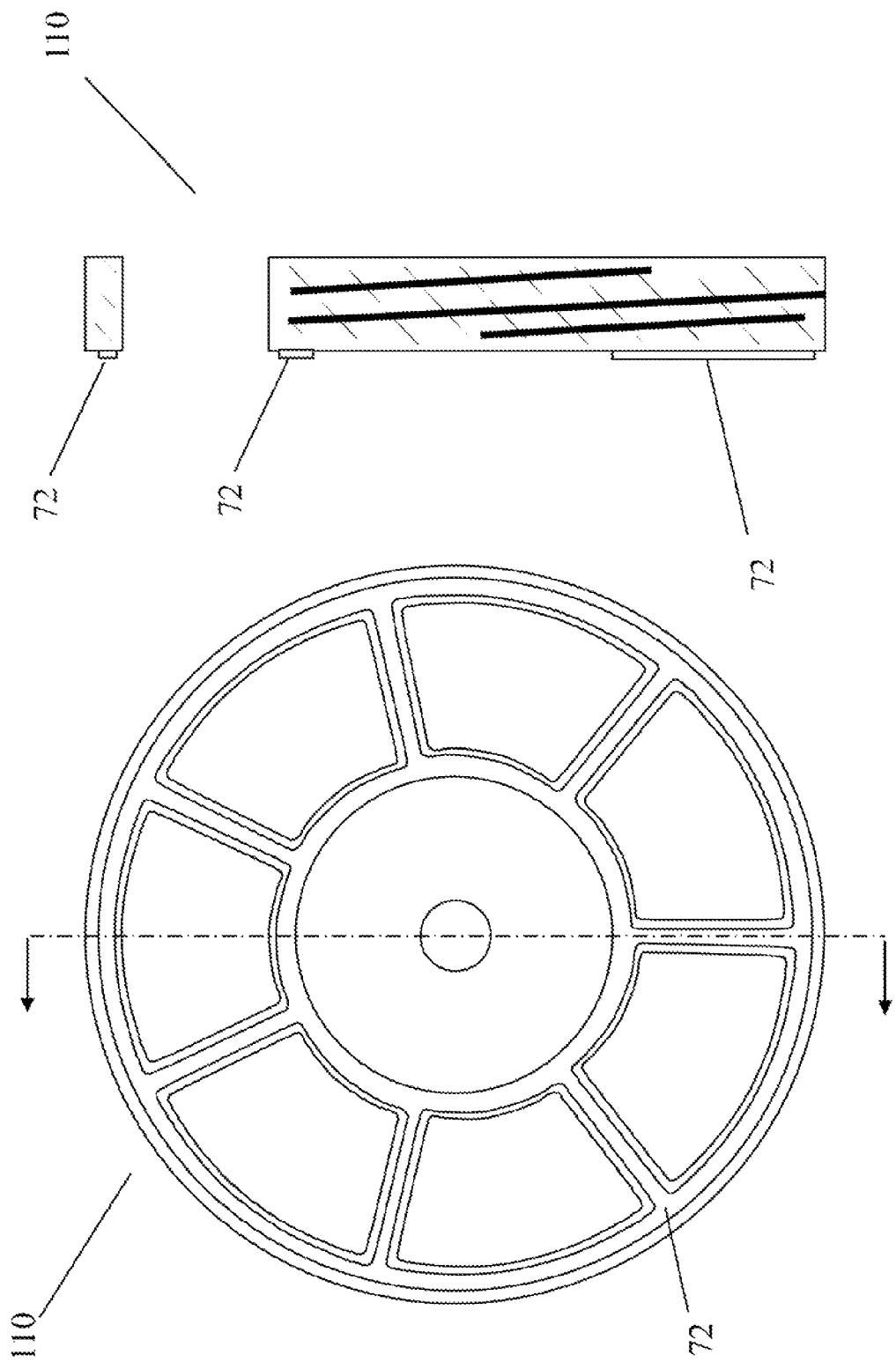
Figure 21:
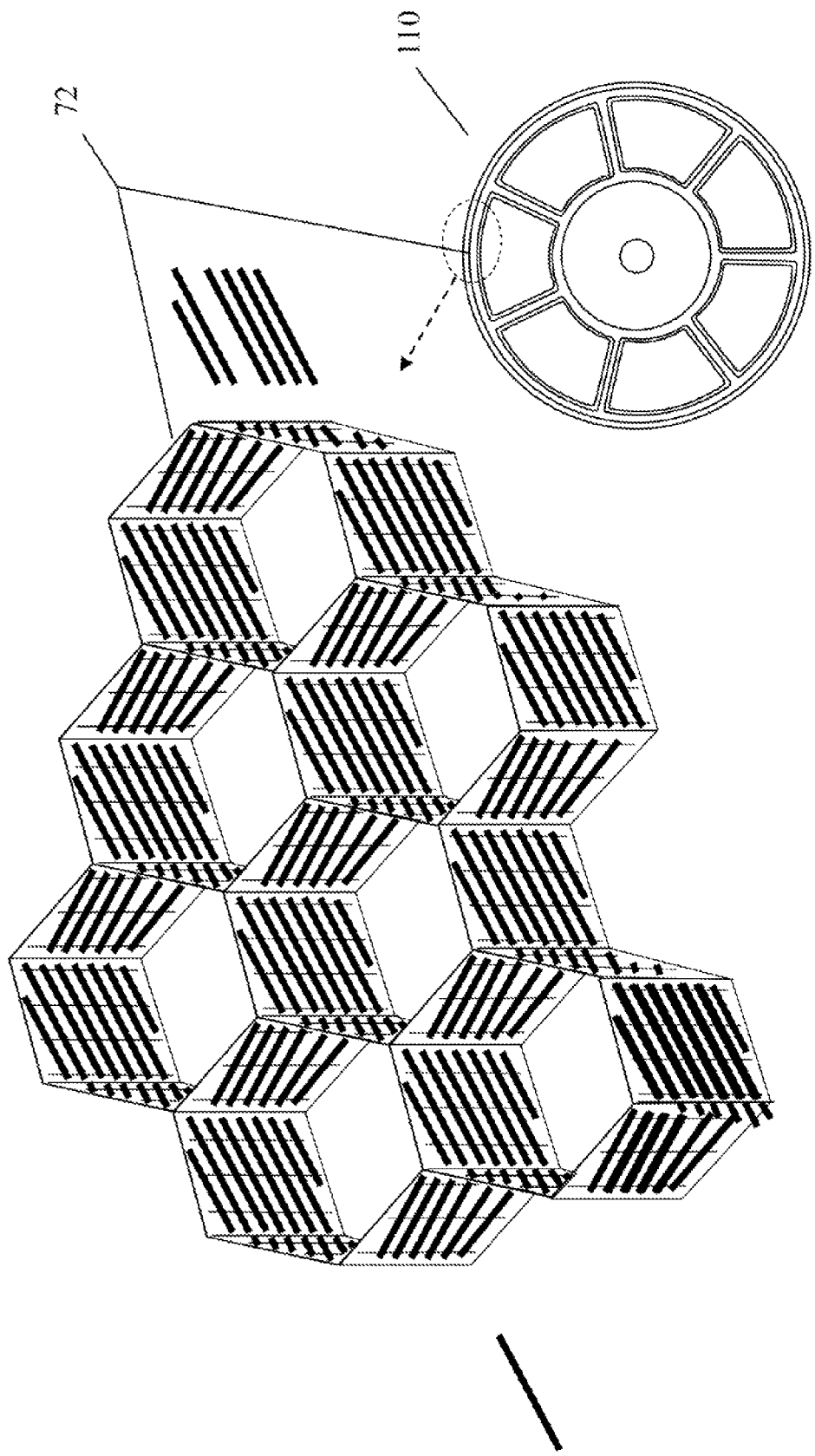

In addition, several types of structures can be used for the sealing material 70. FIGS. 19-21 illustrate one exemplary structure. The structure shown for the sealing section 70 is a honeycomb structure, as best seen in FIG. 21. This honeycomb structure allows for relatively low weight and relatively high strength. Typical materials used to construct a honeycomb seal are aluminum or various types of steel.

Figure 22:
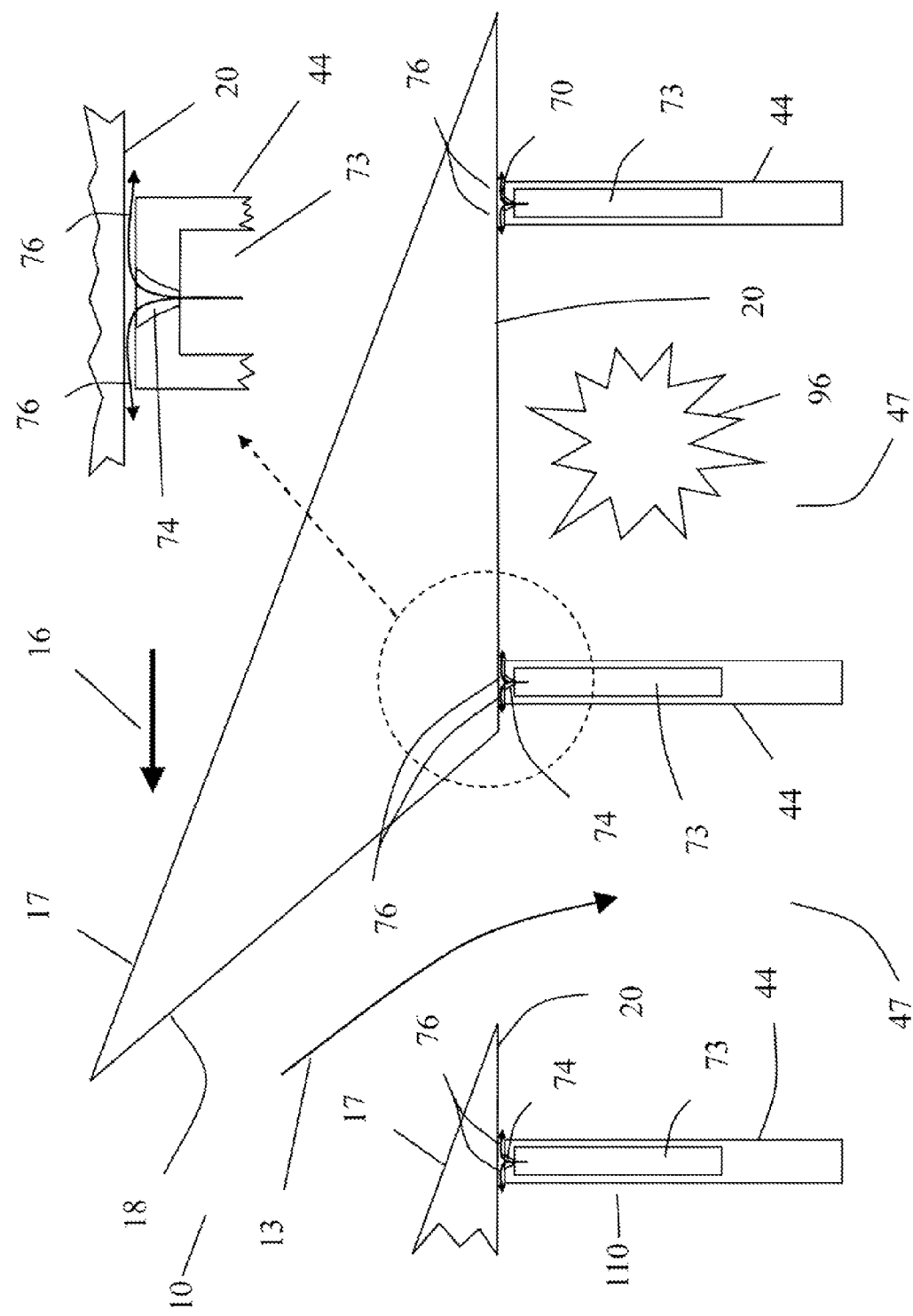
FIGS. 22 and 23 illustrate a seal design for directing gases to effectively limit or retard leakage of gases between adjacent detonation chambers in accordance with one embodiment of an apparatus illustrating principles of the present invention.
Figure 23:
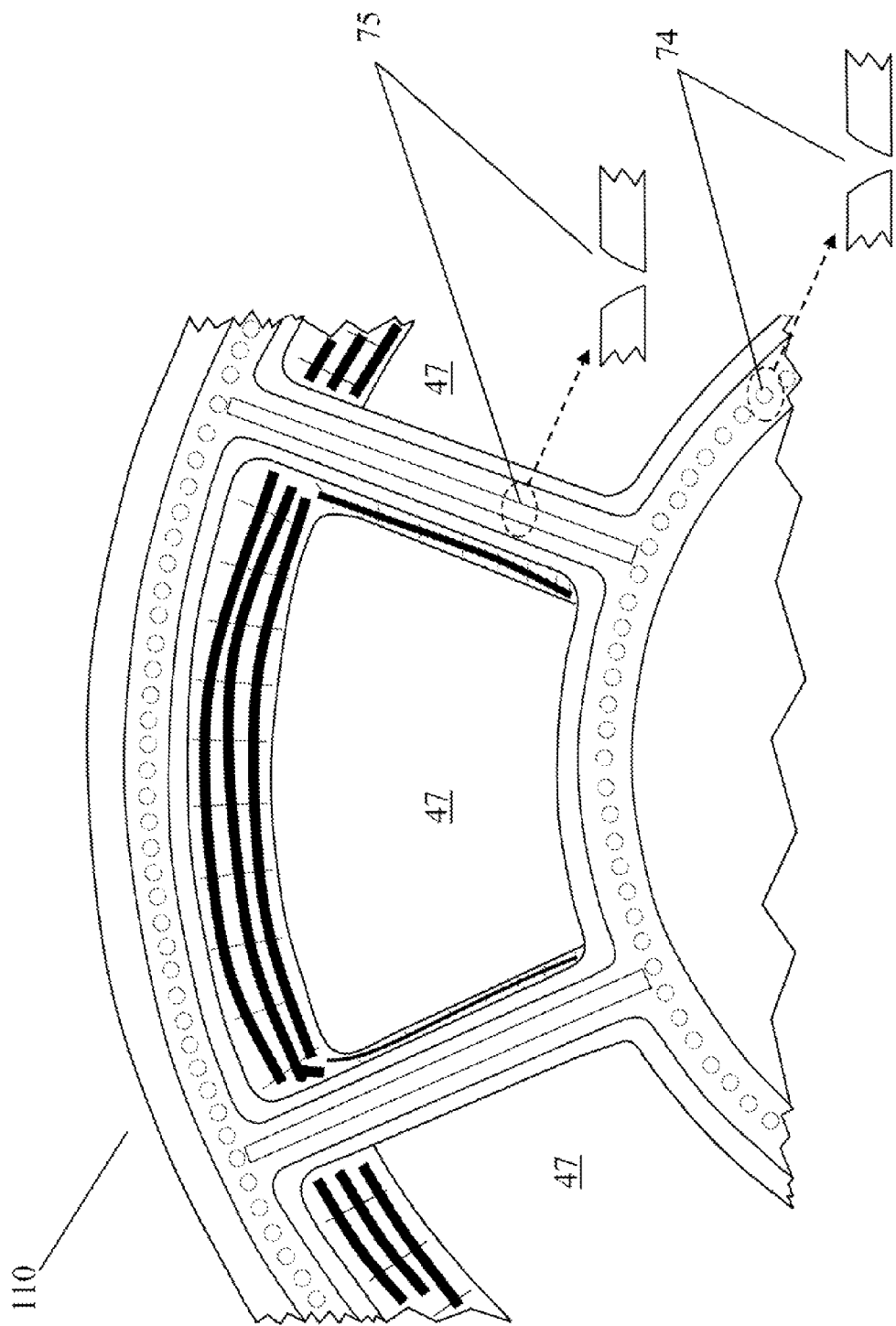

Another embodiment of the present invention is illustrated in FIGS. 22 and 23. In this embodiment, a stream of high-pressure gas, such as air, is provided to limit or retard the leakage of hot combustion gases between adjacent detonation chambers of the PDE. High-pressure gas 76 from an external source is ducted through the webs 44 (struts), which in this embodiment are hollow, and through an opening 74 (orifice) in the leading edge of the strut 44. The air exiting the opening 74 substantially fills any gap present between the rotor 10 and the sealing section 110. The high pressure opposing airflow 76 limits or retards the leakage of gases escaping from the detonation chambers 47. FIG. 23 shows one arrangement of a seal in the leading edge of the sealing section 110. As shown, a system of slots 75 and the apertures 74 (openings) along with the seal act as a means for directing air to limit or retard leakage. Although FIG. 23 shows a specific arrangement of the apertures 74 and the slots 75, it should be understood that any combination of apertures, slots, or other such structures are contemplated to be arranged for providing streams of pressurized gases to limit or retard leakage between the detonation chambers 47.

An alternate embodiment for limiting or retarding the leakage of gases between chambers is shown in FIG. 24. This embodiment includes an arrangement of seals, slots, and apertures similar to that shown in FIGS. 22 and 23; however, instead of using high-pressure air, the seals, slots, and apertures are used as a means for directing air to limit or retard leakage by providing suction at the leading edge 45 of the sealing section 110. The suction captures a portion of the gas along the interface that escape from the detonation chambers 47 and exhausts the portion of the gas by directing the gas away from the interface such that leakage of the gas into adjacent chambers 47 is limited or retarded. The suction airflow 80 enters the webs 44 (struts), which are hollow, via openings 79 and passes through passages 78 in the hollow webs 44 to be exhausted.

It is to be understood that the materials, structures, and embodiments discussed with reference to FIGS. 17-24 may be used in either the embodiment including the sealing material on the engine frame or the embodiment including the sealing material on the sealing section, which is attached to the engine frame.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A system of controlling airflow into a pulse detonation engine, the system including:
    a rotary airflow controller valve, receiving air from a high-speed inlet, including a plurality of blades spanning respective circumferences of the rotary airflow controller so that an entire circumference of the rotary airflow controller is spanned by the plurality of blades, each of the blades defining a respective upstream airflow surface and a respective downstream airflow surface, the upstream airflow surface of a first one of the blades and the downstream airflow surface of a second one of the blades, which is adjacent to the first blade, defining a respective open passage between the first and second blades to a respective open sector at an exit of the airflow controller, each of the blades including a base defining a respective sealing surface at the exit of the airflow controller, and the exit of the airflow controller alternately including the open sectors and the sealing surfaces;
    an engine frame including a plurality of detonation chambers; and
    a sealing mechanism between the rotary airflow controller valve and the engine frame, the sealing mechanism being associated with the engine frame and limiting leakage of a gas from a first of the detonation chambers to a second of the detonation chambers.

2. The system of controlling airflow into a pulse detonation engine as set forth in claim 1, wherein the sealing mechanism is secured to a leading edge of the engine frame.

3. The system of controlling airflow into a pulse detonation engine as set forth in claim 2, wherein the sealing mechanism includes a solid material.

4. The system of controlling airflow into a pulse detonation engine as set forth in claim 3, wherein the solid material is a metal material.

5. The system of controlling airflow into a pulse detonation engine as set forth in claim 1, wherein:
    the sealing mechanism cooperates with the sealing surfaces for limiting the leakage of the gas from the first detonation chamber to the second detonation chamber.

6. The system of controlling airflow into a pulse detonation engine as set forth in claim 5, further including:
    a gap between the sealing mechanism and the sealing surface, the gap permitting movement of the rotary airflow controller valve relative to the engine frame while limiting the leakage of the gas from the first detonation chamber to the second detonation chamber.

7. The system of controlling airflow into a pulse detonation engine as set forth in claim 6, wherein the gap is about 0.003 inches.

8. The system of controlling airflow into a pulse detonation engine as set forth in claim 1, wherein the sealing mechanism includes:
    a sealing segment between the rotary airflow controller valve and the engine frame, the sealing segment being mechanically secured to the engine frame and including a seal, the seal limiting the leakage of the gas from the first detonation chamber to the second detonation chamber.

9. The system of controlling airflow into a pulse detonation engine as set forth in claim 8, wherein the sealing segment is secured directly to the engine frame to create a straight joint between the sealing segment and the engine frame.

10. The system of controlling airflow into a pulse detonation engine as set forth in claim 8, wherein the sealing segment is secured to the engine frame to create an offset joint between the sealing segment and the engine frame.

11. The system of controlling airflow into a pulse detonation engine as set forth in claim 8, wherein the seal interacts with a sealing surface of the rotary airflow controller valve for limiting the leakage of the gas from the first detonation chamber to the second detonation chamber.

12. The system of controlling airflow into a pulse detonation engine as set forth in claim 11, further including:
    a gap between the seal and the sealing surface, the gap permitting movement of the rotary airflow controller valve relative to the sealing segment and the engine frame while limiting the leakage of the gas from the first detonation chamber to the second detonation chamber.

13. The system of controlling airflow into a pulse detonation engine as set forth in claim 8, wherein the seal includes a solid material.

14. The system of controlling airflow into a pulse detonation engine as set forth in claim 13, wherein the solid material is a metal material.

15. A system of controlling airflow into a pulse detonation engine, the system including:
    a rotary airflow controller valve, receiving air from a high-speed inlet, including a plurality of blades spanning respective circumferences of the rotary airflow controller so that an entire circumference of the rotary airflow controller is spanned by the plurality of blades, each of the blades defining a respective upstream airflow surface and a respective downstream airflow surface, the upstream airflow surface of a first one of the blades and the downstream airflow surface of a second one of the blades, which is adjacent to the first blade, defining a respective open passage between the first and second blades to a respective open sector at an exit of the airflow controller, each of the blades including a base defining a respective sealing surface at the exit of the airflow controller, and the exit of the airflow controller alternately including the open sectors and the sealing surfaces;
    an engine frame including a plurality of detonation chambers; and
    a means for limiting leakage of a gas from a first of the detonation chambers to a second of the detonation chambers located between the rotary airflow controller valve and the engine frame.

16. The system of controlling airflow into a pulse detonation engine as set forth in claim 15, wherein the means for limiting includes:
    a sealing mechanism associated with the engine frame, the sealing mechanism being between the rotary airflow controller valve and the engine frame.

17. The system of controlling airflow into a pulse detonation engine as set forth in claim 16, wherein the sealing mechanism is secured to a leading edge of the engine frame.

18. The system of controlling airflow into a pulse detonation engine as set forth in claim 16, wherein;
    the sealing mechanism cooperates with the sealing surfaces for limiting the leakage of the gas from the first detonation chamber to the second detonation chamber.

19. The system of controlling airflow into a pulse detonation engine as set forth in claim 18, wherein the means for limiting further includes:

a gap between the sealing mechanism and the sealing surface, the gap permitting movement of the rotary airflow controller valve relative to the engine frame while limiting the leakage of the gas from the first detonation chamber to the second detonation chamber.

20. The system of controlling airflow into a pulse detonation engine as set forth in claim 16, wherein the sealing mechanism includes:

a sealing segment between the rotary airflow controller valve and the engine frame, the sealing segment being mechanically secured to the engine frame and including a seal, the seal limiting the leakage of the gas from the first detonation chamber to the second detonation chamber.

21. The system of controlling airflow into a pulse detonation engine as set forth in claim 20, wherein the seal interacts with a sealing surface of the rotary airflow controller valve for limiting the leakage of the gas from the first detonation chamber to the second detonation chamber.

22. The system of controlling airflow into a pulse detonation engine as set forth in claim 21, wherein the means for limiting further includes:

a gap between the seal and the sealing surface, the gap permitting movement of the rotary airflow controller valve relative to the sealing segment and the engine frame while limiting the leakage of the gas from the first detonation chamber to the second detonation chamber.

23. A method for controlling airflow into a pulse detonation engine, the method including:

receiving air from a high-speed inlet into a rotary airflow controller valve including a plurality of blades spanning respective circumferences of the rotary airflow controller so that an entire circumference of the rotary airflow controller is spanned by the plurality of blades, each of the blades defining a respective upstream airflow surface and a respective downstream airflow surface, the upstream airflow surface of a first one of the blades and the downstream airflow surface of a second one of the blades, which is adjacent to the first blade, defining a respective open passage between the first and second blades to a respective open sector at an exit of the airflow controller, each of the blades including a base defining a respective sealing surface at the exit of the airflow controller, and the exit of the airflow controller alternately including the open sectors and the sealing surfaces;

passing the air from the rotary airflow controller valve to an engine frame including a plurality of detonation chambers; and limiting leakage of a gas from a first of the detonation chambers to a second of the detonation chambers via a sealing mechanism associated with the engine frame and between the rotary airflow controller valve and the engine frame.

24. The method for controlling airflow into a pulse detonation engine as set forth in claim 23, wherein the limiting step includes:

rotating the engine frame relative to the rotary airflow controller valve; and passing the air through a gap between the engine frame and the rotary airflow controller valve.

25. The method for controlling airflow into a pulse detonation engine as set forth in claim 23, wherein the limiting step includes:

rotating the rotary airflow controller valve relative to the engine frame and a sealing segment; and passing the air through a gap between the sealing segment and the rotary airflow controller valve.

26. The system of controlling airflow into a pulse detonation engine as set forth in claim 3, wherein the solid material is one of a plastic material and a carbon material.

27. The system of controlling airflow into a pulse detonation engine as set forth in claim 13, wherein the solid material is one of a plastic material and a carbon material.

* * * * *